(12) United States Patent
Schomaker et al.

(10) Patent No.: US 6,868,574 B2
(45) Date of Patent: Mar. 22, 2005

(54) FOLDING RAMP

(75) Inventors: Jerome A. Schomaker, Granger, IN (US); Dean Mettler, Sturgis, MI (US); James Weiderman, Sturgis, MI (US)

(73) Assignee: Lund International, Inc., Anoka, MN (US)

( * ) Notice: Subject to any disclaimer, the term of this patent is extended or adjusted under 35 U.S.C. 154(b) by 0 days.

(21) Appl. No.: 10/756,570

(22) Filed: Jan. 12, 2004

(65) Prior Publication Data

US 2004/0143915 A1 Jul. 29, 2004

Related U.S. Application Data

(63) Continuation of application No. 10/068,290, filed on Feb. 5, 2002, now Pat. No. 6,701,563.

(51) Int. Cl.[7] .................................................. E01D 1/00
(52) U.S. Cl. .................................... 14/69.5; 414/537
(58) Field of Search ........................ 14/69.5, 70, 71.1, 14/71.3, 71.5, 71.7, 72.5; 414/537, 538, 462

(56) References Cited

U.S. PATENT DOCUMENTS

| | | |
|---|---|---|
| 3,113,696 A | 12/1963 | Kubodera |
| 3,352,440 A | 11/1967 | Wilson |
| 3,642,156 A | 2/1972 | Stenson |
| 4,084,713 A | 4/1978 | Rohrs et al. |
| 4,668,002 A | 5/1987 | Hanson |
| 4,864,672 A | 9/1989 | Altieri et al. |
| 5,096,362 A | 3/1992 | Best |
| 5,211,437 A | 5/1993 | Gerulf |
| 5,536,058 A | 7/1996 | Otis |
| 5,538,308 A | 7/1996 | Floe |
| 5,645,394 A | 7/1997 | Hays |
| 5,730,577 A | 3/1998 | Jones |
| 5,768,733 A | 6/1998 | Kneebone |
| 5,769,593 A | 6/1998 | Buffaloe |
| 5,791,717 A | 8/1998 | Reich et al. |
| 6,059,344 A | 5/2000 | Radosevich |
| 6,139,249 A | 10/2000 | Lucht |
| 6,250,874 B1 | 6/2001 | Cross |
| 6,386,819 B1 | 5/2002 | Schultz |
| 6,575,516 B2 * | 6/2003 | Webber .................... 296/61 |

\* cited by examiner

*Primary Examiner*—Thomas B. Will
*Assistant Examiner*—Alexandra K. Pechhold
(74) *Attorney, Agent, or Firm*—Merchant & Gould P.C.

(57) ABSTRACT

A folding ramp is provided that includes an upper ramp, a lower ramp, and at least one handle assembly for providing ease of transport of the folding ramp. The upper ramp extends between a first end and a second end, and includes an upper ramp loading track, an upper first side support, an upper second side support, and a vehicle mounting member. The lower ramp extends between a first end and a second end, and the lower ramp includes a lower ramp loading track, a lower first side support, a lower second side support, a ground engaging member, and the rotation member. The upper ramp and the lower ramp include a rotation member that extends between the upper and lower first side supports and the upper and lower second side supports to allow rotation of the lower ramp relative to the upper ramp. The lower ramp loading track includes a first side and a second side and extends from the first end of the lower ramp to the second end of the lower ramp. The lower first side support extends along the first side of the lower ramp loading track at an angle to the lower ramp loading track that is sufficient to support the lower ramp loading track. The lower second side support extends along the second side of the lower ramp loading track at an angle to the lower ramp loading track that is sufficient to support the lower ramp loading track. The ground engaging surface is provided at the second end of the lower ramp for engaging the ground.

15 Claims, 8 Drawing Sheets

FOLDING RAMP

This application is a continuation of 10/068,290 filed Feb. 5, 2002, now U.S. Pat. No. 6,701,563.

FIELD OF THE INVENTION

The invention relates to a folding ramp having an upper ramp and a lower ramp that rotate relative to each other about a rotation member so that the ramp can be provided in an extended configuration for use and in a folded configuration for storage and transport.

BACKGROUND OF THE INVENTION

Ramps are available for assisting with the loading and/or unloading of the cargo area of motor vehicles. Ramps are often used with sports utility vehicles and pickup trucks, and often extend from the cargo area of the vehicle to the ground. For certain types of items to be transported, it is desirable to utilize a ramp. Exemplary items include lawn mowers, riding/garden tractors, all terrain vehicles, motorcycles, snowmobiles, and hand trucks for moving large and/or heavy items such as furniture and appliances.

There are several United States patents that describe ramps. For example, see U.S. Pat. No. 6,059,344 to Radosevich, U.S. Pat. No. 5,645,394 to Hays, U.S. Pat. No. 6,139,249 to Lucht, U.S. Pat. No. 5,536,058 to Otis, U.S. Pat. No. 5,096,362 to Best, and U.S. Pat. No. 4,668,022 to Hanson.

SUMMARY OF THE INVENTION

A folding ramp is provided according to the invention. The folding ramp includes an upper ramp, a lower ramp, and at least one handle assembly for providing ease of transport of the folding ramp.

The upper ramp extends between a first end and a second end. The upper ramp includes an upper ramp loading track, an upper first side support, an upper second side support, and a vehicle mounting member. The upper ramp loading track has a first side and a second side and extends from the first end of the upper ramp to the second end of the upper ramp. The upper first side support extends along the first side of the upper ramp loading track and at an angle to the upper ramp loading track sufficient to support the upper ramp loading track. The upper second side support extends along the second side of the upper ramp loading track at an angle to the upper ramp loading track that is sufficient to support the upper ramp loading track. The vehicle mounting member is provided at the first end of the upper ramp and extends from the first end of the upper ramp loading track for extension into a vehicle cargo area.

The lower ramp extends between a first end and a second end, and the lower ramp includes a lower ramp loading track, a lower first side support, a lower second side support, and a ground engaging member. The lower ramp loading track includes a first side and a second side and extends from the first end of the lower ramp to the second end of the lower ramp. The lower first side support extends along the first side of the lower ramp loading track at an angle to the lower ramp loading track that is sufficient to support the lower ramp loading track. The lower second side support extends along the second side of the lower ramp loading track at an angle to the lower ramp loading track that is sufficient to support the lower ramp loading track. The ground engaging surface is provided at the second end of the lower ramp for engaging the ground.

The upper ramp and the lower ramp include a rotation member that extends between the upper and lower first side support and the upper and lower second side support to allow rotation of the lower ramp relative to the upper ramp.

The handle assembly can be attached to at least one of the lower first side support, the lower second side support, the upper first side support, and the upper second side support.

DETAILED DESCRIPTION OF THE INVENTION

Figure 1:
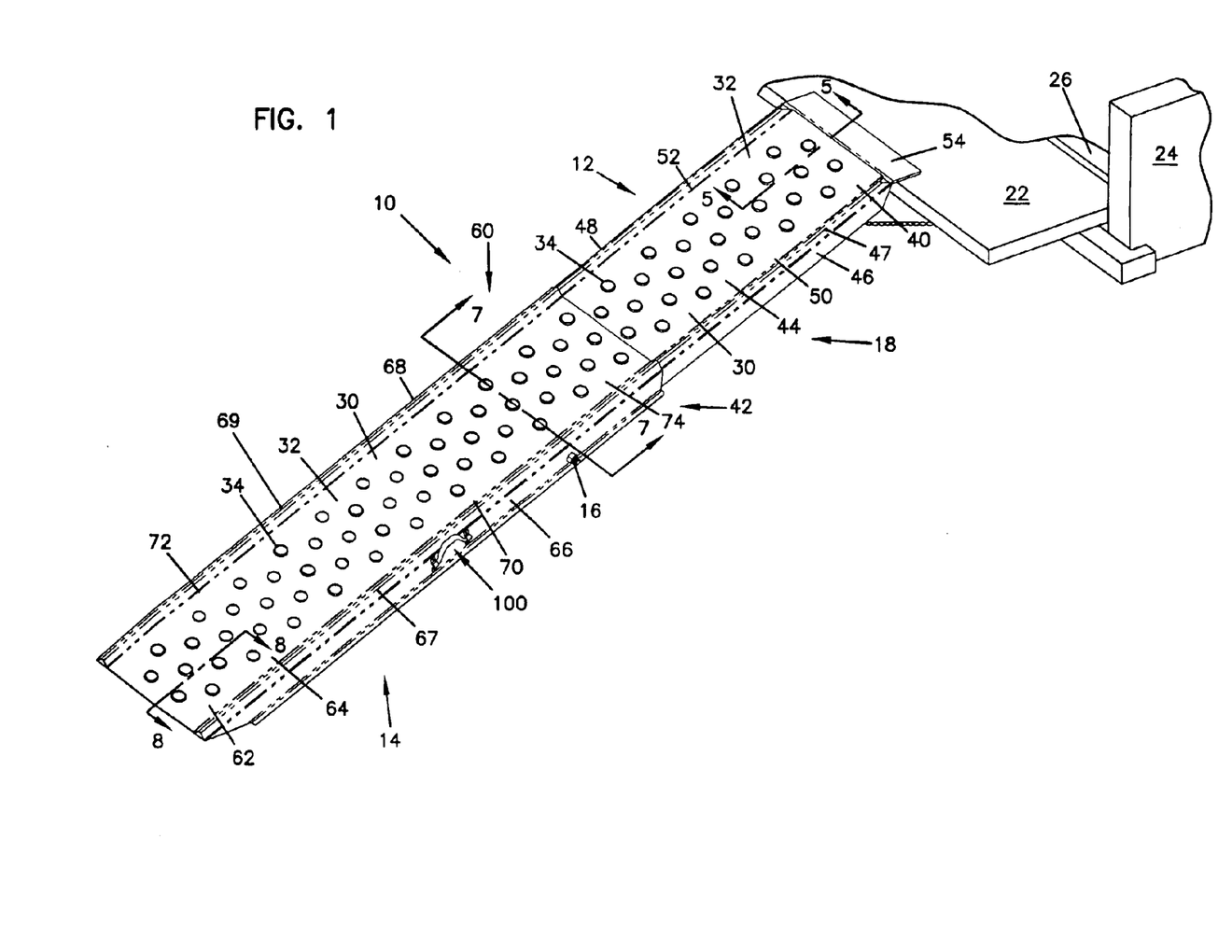
FIG. 1 is a perspective view of a folding ramp according to the principles of the invention shown extending from the tailgate of a pickup truck.
Figure 2:
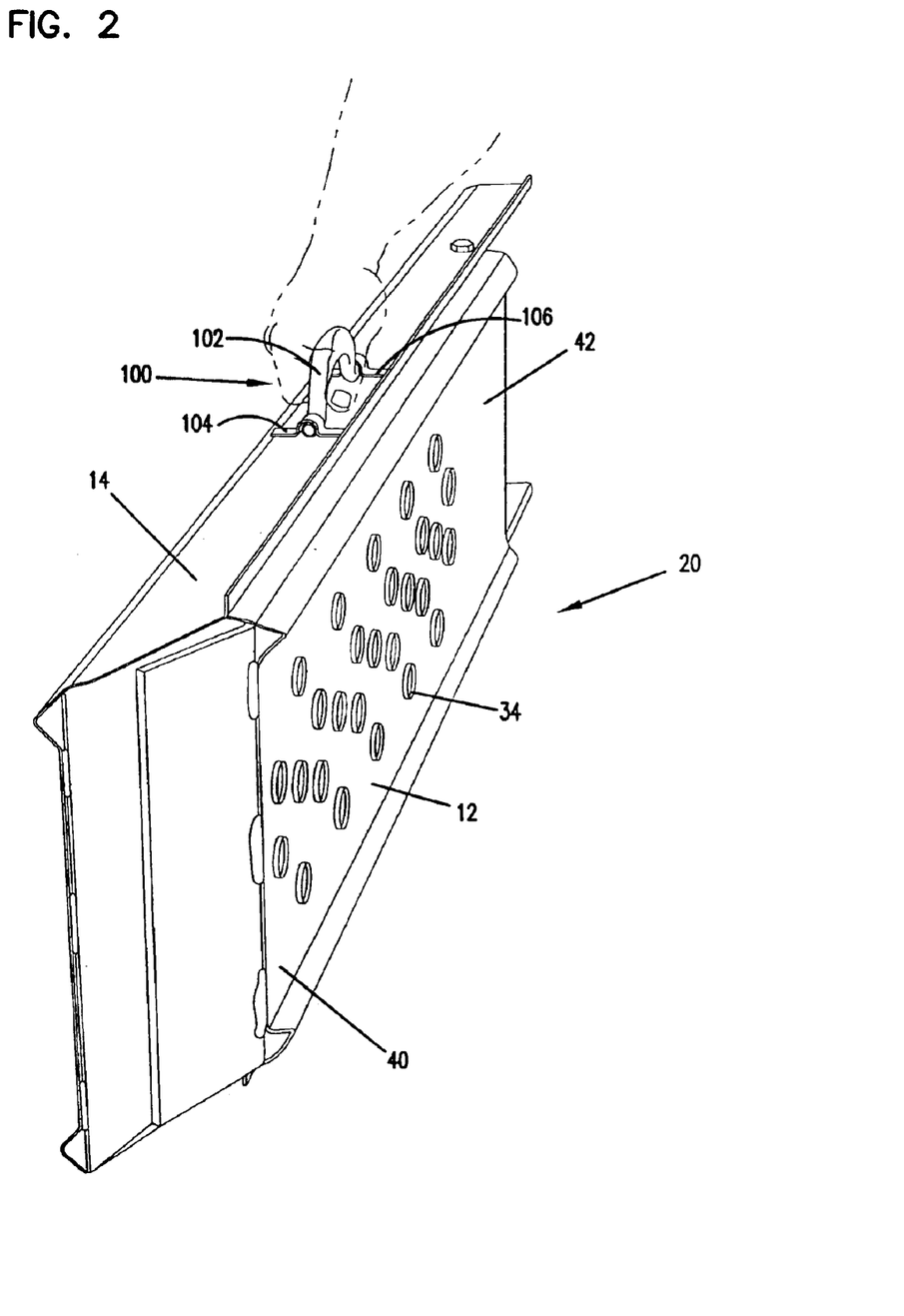
FIG. 2 is a perspective view of the folding ramp of FIG. 1 provided in a folded configuration for ease of transport.

Now referring to FIGS. 1–8, a folding ramp according to principles of the invention is shown at reference numeral 10. The folding ramp 10 can be referred to more conveniently as the "ramp." The ramp includes an upper ramp 12, a lower ramp 14, and a rotation member 16 about which the upper ramp 12 and the lower ramp 14 rotate. As shown in FIG. 1, the ramp 10 is provided in an extended configuration 18 which allows it to be used as a ramp. As shown in FIG. 2, the ramp 10 is shown in a folded configuration 20. By providing the ramp 10 in a folded configuration 20, the ramp can be more easily transported and takes up less storage space making it easier to store the folding ramp in a vehicle cargo area.

The ramp 10 is shown in FIG. 1 extending from the tailgate 22 of a motor vehicle 24. Although one ramp 10 is shown, it should be understood that multiple ramps can be provided according to the invention for assisting with the loading and/or unloading of items from the cargo area 26 of the vehicle 24. For example, if a motorcycle is loaded into the back of a pickup truck, it may be sufficient to only use one ramp for loading the motorcycle. In contrast, if the item to be loaded is a lawn mower having a wheel span width greater than the width of one ramp, it may be desirable to provide two ramps to assist loading the lawn mower into the cargo area.

The upper ramp 12 and the lower ramp 14 include a top surface 30 upon which items to be moved are conveyed across. The top surface 30 includes a traction surface 32. The traction surface 32 is provided for enhancing the coefficient of friction between the ramp and items moving across the ramp. Because the ramp is generally provided at an incline, it is desirable to increase friction to avoid slipping on the top surface 30. As shown in FIG. 1, the friction surface 32 includes a plurality of openings 34. When the ramp is manufactured from a metallic material such as aluminum, the openings 34 can be prepared by die stamping. Other surfaces can be provided to increase friction including adhesive tape such as Adhesive Backed Grit Tape by Jessup Mfg. of Ilinois.

The upper ramp 12 includes a first end 40, a second end 42, an upper ramp loading track 44, an upper first side support 46, and an upper second side support 48. The upper ramp loading track 44 includes a first side 50 and a second side 52. The upper first side support 46 extends along the first side 50, and the upper second side support 48 extends along the second side 52. In general, the upper first side support 46 and the upper second side support 48 are constructed so that they extend along the first side 50 and the second side 52, respectively, to help support the upper ramp loading track 44 when it is provided under a load resulting from the movement of an item thereover. An upper first ridge 47 is provided extending along the first side 50 between the upper ramp loading track 44 and the upper first side support 46. An upper second ridge 49 is provided extending along the second side 52 between the upper ramp loading track 44 and the upper second side support 48. The ridges 47 and 49 are provided to enhance beam strength and are useful as barriers to help keep items, such as wheels, in the upper ramp loading track 44.

The upper ramp first end 40 includes a vehicle mounting member 54 that is constructed so that it extends onto the motor vehicle 24. As shown in FIG. 1, the vehicle mounting member 54 extends onto the tailgate 22.

The upper ramp second end 42 includes a rotation member 16 extending between the upper first side support 46 and the upper second side support 48. The upper ramp loading track 44, the upper first side support 46, and the upper second side support 48 are constructed in the upper ramp second end 42 so that the upper ramp 12 can rotate relative to the lower ramp 14 about the rotation member 16. As shown in FIG. 1, the ramp 10 is provided in an extended configuration 18. The upper ramp 12 is capable of rotating relative to the lower ramp 14 so that the ramp 10 is provided in a folded configuration 20 as shown in FIG. 2. Although the embodiment of the ramp shown in FIGS. 1 and 2 have the upper ramp nesting within the lower ramp when extended and when provided in a folded configuration, another embodiment of the invention includes the design where the lower ramp nests within the upper ramp.

Figure 3:
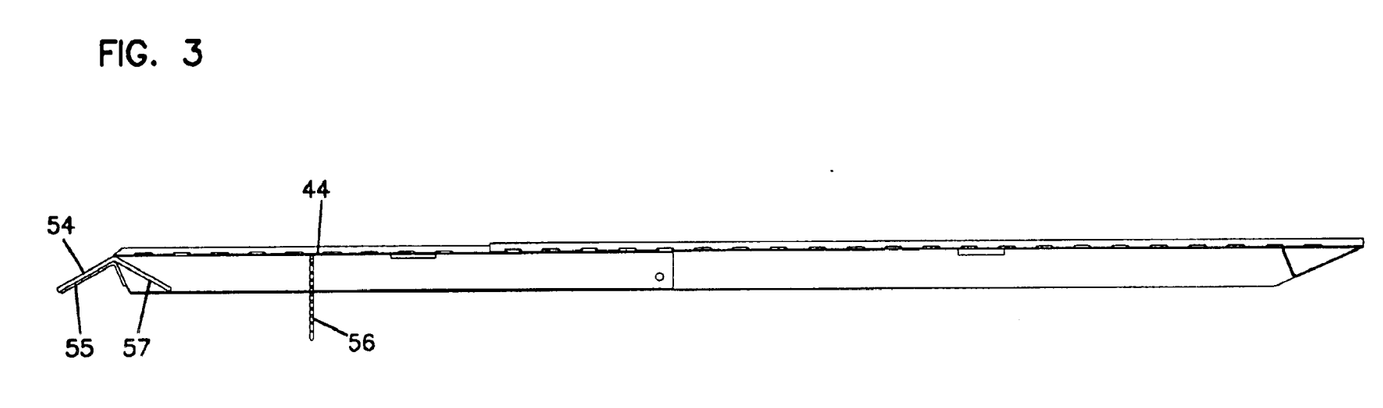
FIG. 3 is a side view of the folding ramp of FIG. 1.
Figure 4:
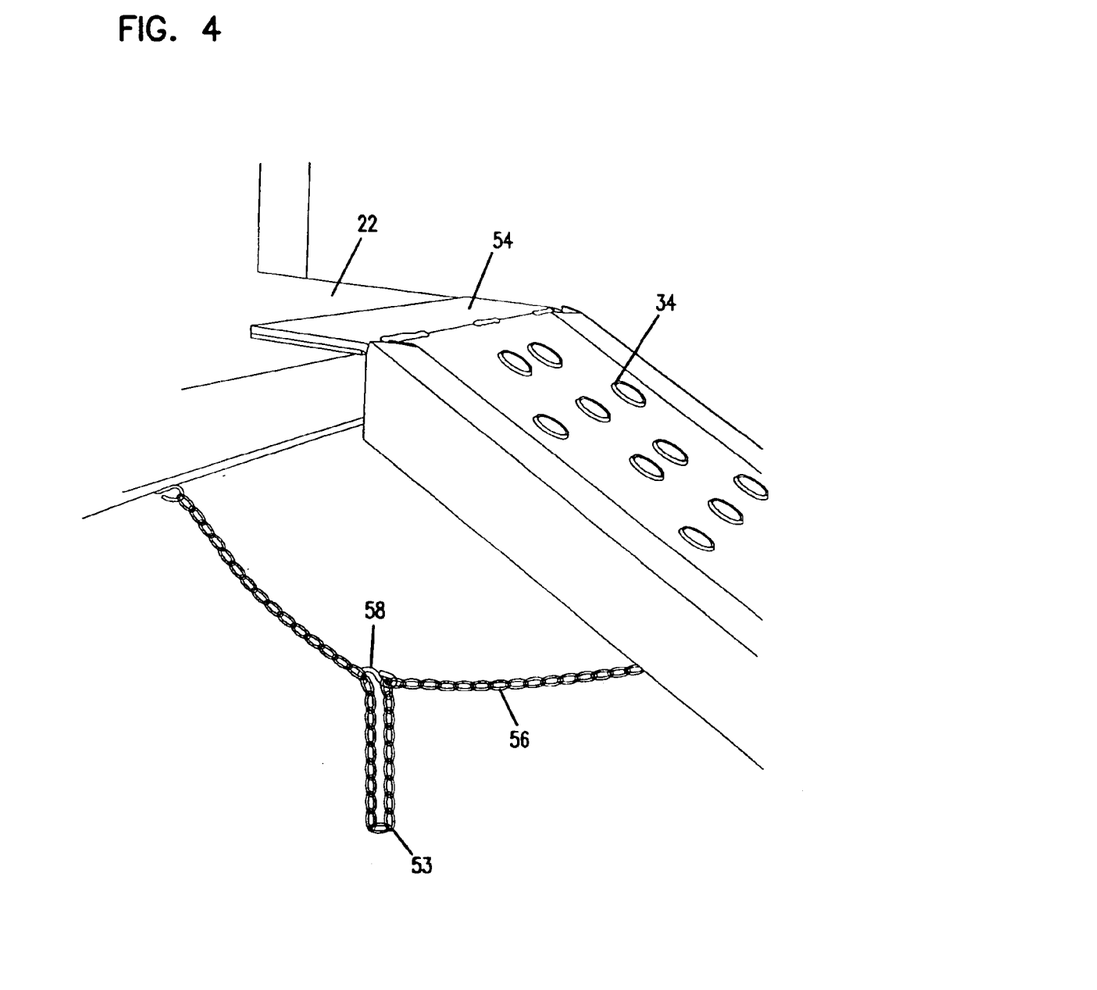
FIG. 4 is a partial perspective view of the folding ramp of FIG. 1.
Figure 5:
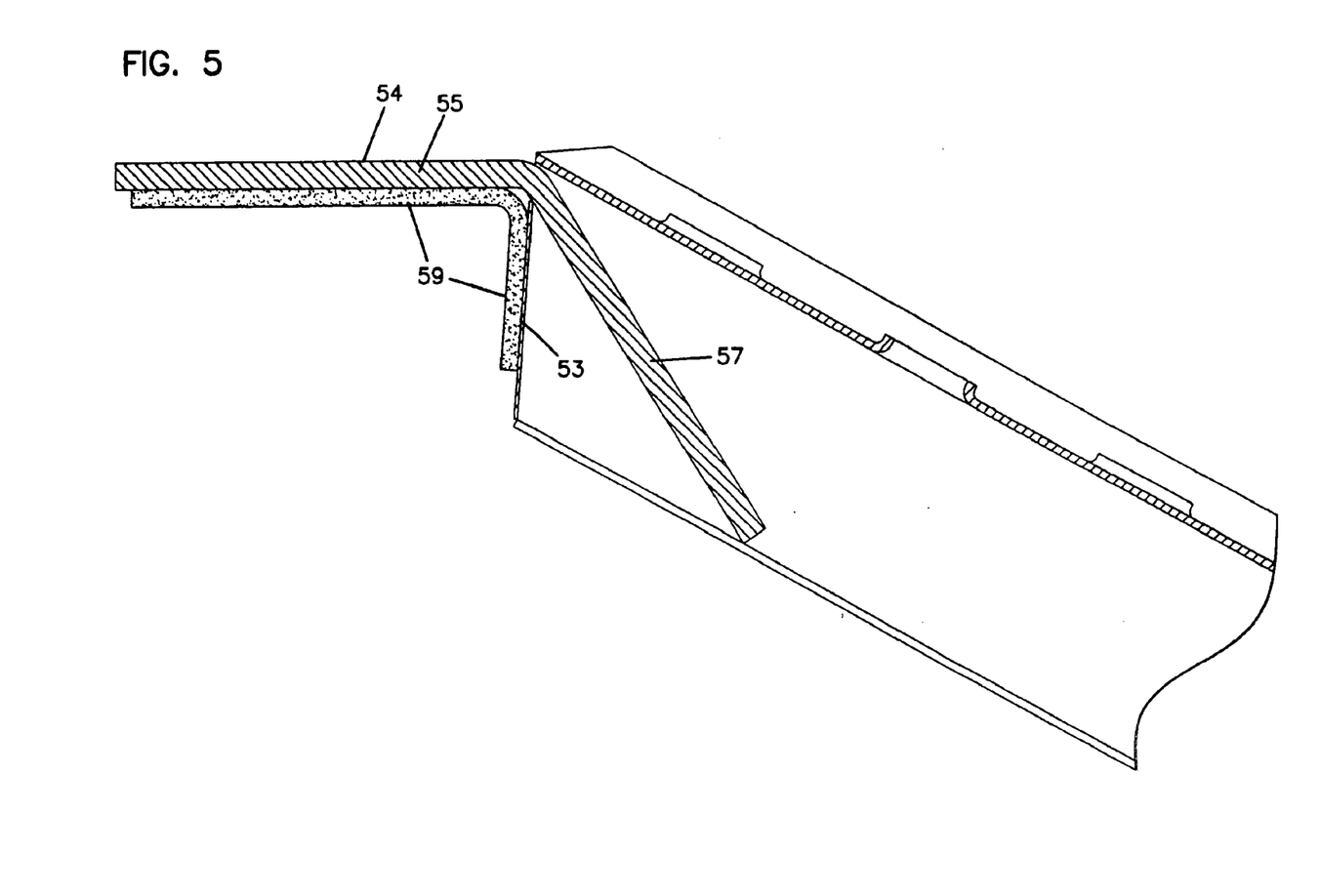
FIG. 5 is a sectional view of the folding ramp of FIG. 1 taken along lines 5—5.

Now referring to FIGS. 3–5, the upper ramp first end 40 is shown having the vehicle mounting member 54 attached at the upper end of the upper ramp second end 42. The vehicle mounting member 54 includes a first arm 55 that extends onto the vehicle for providing a transition between the upper ramp 12 and the vehicle, and a second arm 57 that extends underneath the upper ramp loading track 44. The second arm 57 attaches to the upper first side support 46 and the upper second side support 48 to help strengthen the connection to the vehicle mounting member 54. In addition, a cap 53 is provided extending from the upper first side support 46 to the upper second side support 48, and helps strengthen the upper ramp 12. A pad 59 is provided between the first arm 55 and the vehicle to help prevent scratching of the vehicle surface and to help resist slippage of the ramp from the vehicle. The pad 59 extends along the cap 53 to help reduce the occurrence of scratches on the vehicle resulting from the cap 53. The general concern is to reduce slippage of the ramp from the vehicle and to prevent scratching the paint of the vehicle. In addition, a security chain 56 can be provided extending from the upper ramp 12 to the vehicle 24 to help prevent slippage of the ramp away from the vehicle. A hook 58 can be provided to take up chain slack 53. As shown in FIG. 3, the chain 56 can be provided attached to the underneath side of the upper ramp loading track 44.

Now referring again to FIGS. 1 and 2, the lower ramp 14 includes a lower ramp first end 60, a lower ramp second end 62, a lower ramp loading track 64, a lower ramp first side support 66, and a lower ramp second side support 68. The lower ramp loading track 64 includes a first side 70 and a second side 72. The lower ramp first side support 66 extends along the lower ramp loading track first side 70, and the lower ramp second side support 68 extends along the lower ramp loading track second side 72. The lower ramp first side support 66 and the lower ramp second side support 68 are provided to assist in supporting the lower ramp loading track 64 when it is provided under a load as a result of moving an item thereover. A lower first ridge 67 is provided along the first side 70 and between the lower ramp loading track 64 and the lower ramp first side support 66. A lower second ridge 69 is provided along the second side 72 between the lower ramp loading track 64 and the lower ramp second side support 68. The ridges 67 and 69 provided the lower ramp 14 with beam strength and function as a barrier to help contain items traveling over the lower ramp loading track 64.

The lower ramp first end 60 includes the rotation member 16 extending from the lower ramp first side support 66 to the lower ramp second side support 68. The lower ramp first end 60 additionally includes an extension 74 that extends beyond the rotation member 16. In general, the extension 74 is provided with a length that is sufficient to help stabilize the upper ramp 12 and the lower ramp 14 in the extended configuration 18 so that the ramp 10 can bear a load and remain in the extended configuration 18. It is expected that the extension 74 will extend at least about three inches beyond the rotation member 16, and can be provided with a length extending between about three inches and about ten inches beyond the rotation member 16. Although the extension 74 can extend more than ten inches beyond the rotation member 16, it is expected that the increase in strength will be offset by the desire to have a compact ramp when it is provided in a folded configuration. The extension 74 can extend between about six inches and about eight inches beyond the rotation member 16. Although the ramp 10 includes an extension 74 on the lower ramp 14, it should be understood that the extension can be provided on the upper ramp second end 42 if the lower ramp is constructed so that it nests within the upper ramp.

Figure 7:
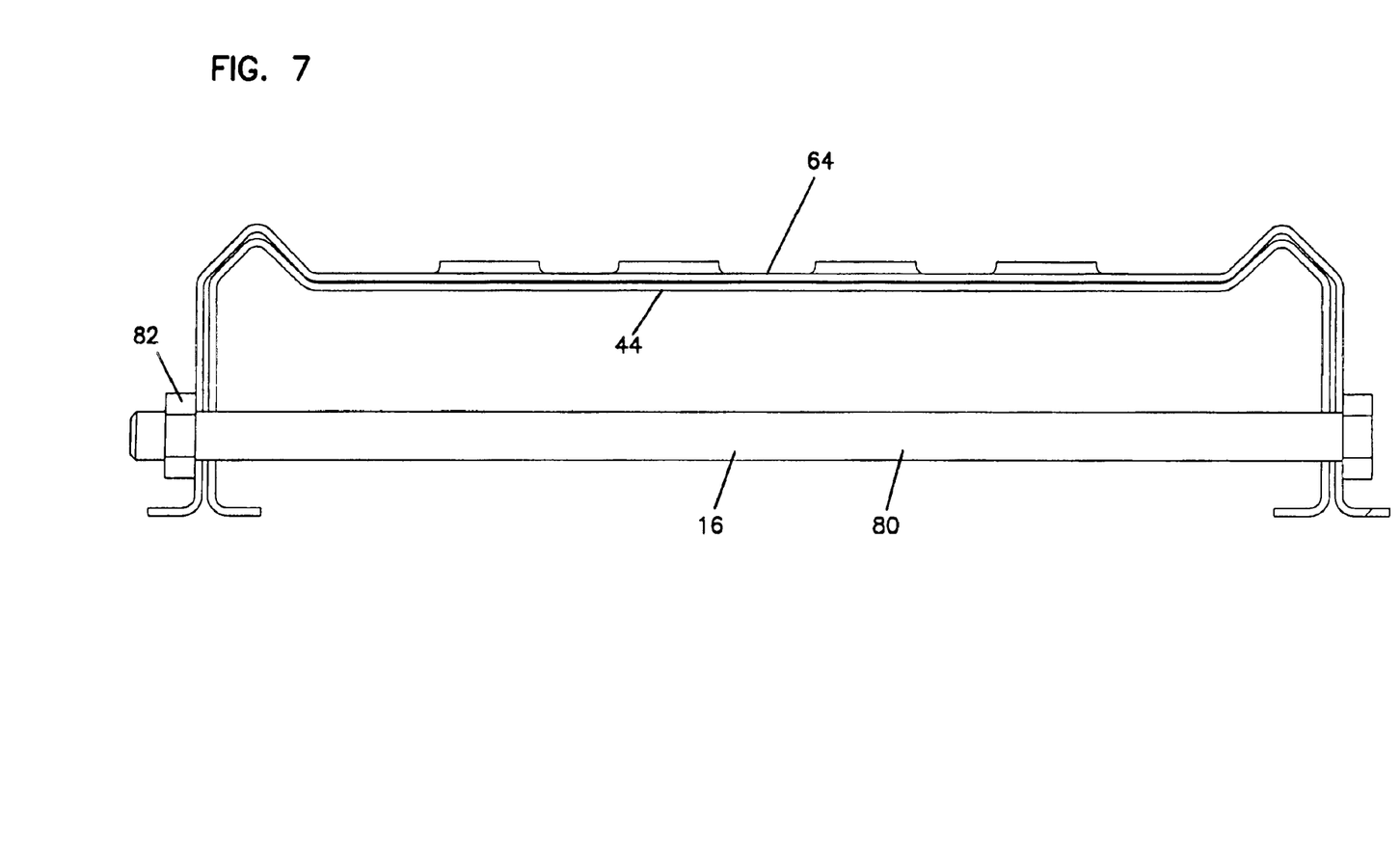
FIG. 7 is a sectional view of the folding ramp of FIG. 1 taken along lines 7—7.

Now referring to FIG. 7, the rotation member 16 is shown as an axis 80 extending between the side supports. The rotation member 16 can be a threaded bolt 80 fastened in place by a nut 82. Exemplary alternative designs for the rotation member 16 include a shaft having a washer and cotter pin. It has been found that a desired level of strength can be provided by having the rotation member extend through the side supports to have strength and keep the sides from spreading when the ramp is provided under a load.

Figure 6:
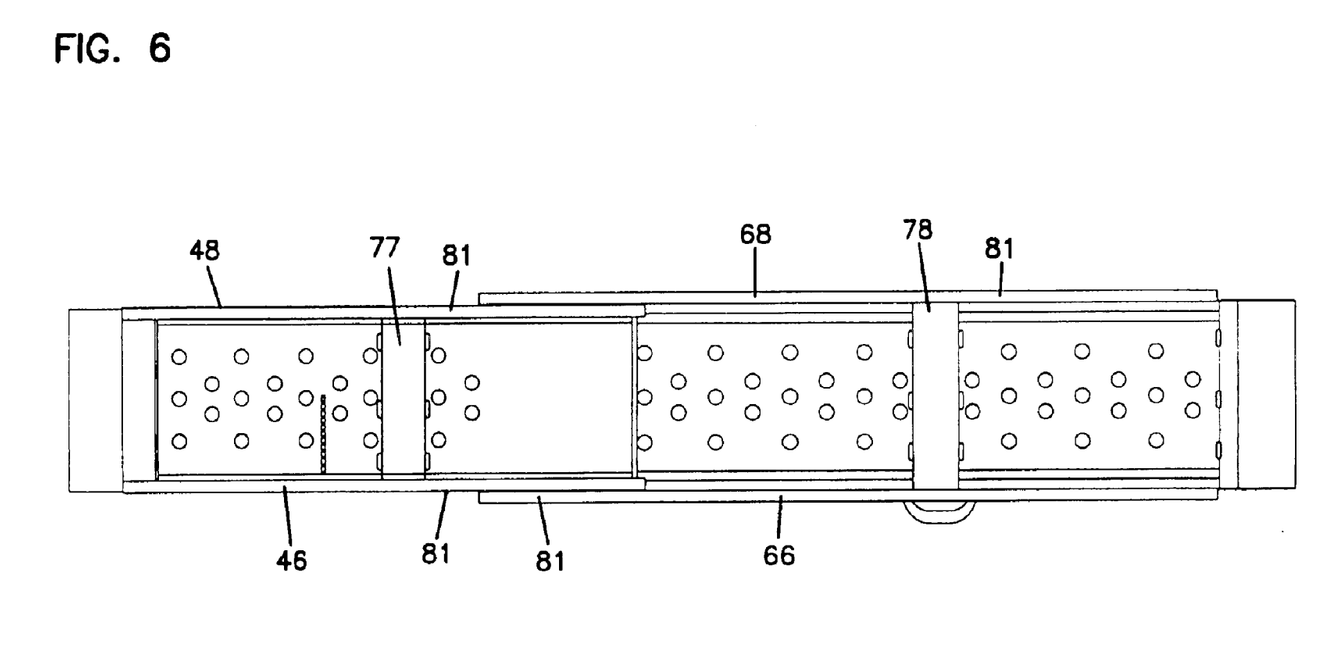
FIG. 6 is a bottom view of the folding ramp of FIG. 1.

As shown in FIG. 6, the upper ramp 12 includes an upper ramp support member 77 that extends from the upper ramp first side support 46 to the upper ramp second side support 48 and extends underneath the upper ramp loading track 44. The lower ramp 14 includes a lower ramp support member 78 that extends from the lower ramp first side support 66 to the lower ramp second side support 68 and helps support the lower ramp loading track 64. In addition, the upper ramp side supports 46 and 48 and the lower ramp side supports 66 and 68 include a bottom side member 81 that extends underneath the ramp 10. The bottom side member 81 provides additional strength.

Figure 8:
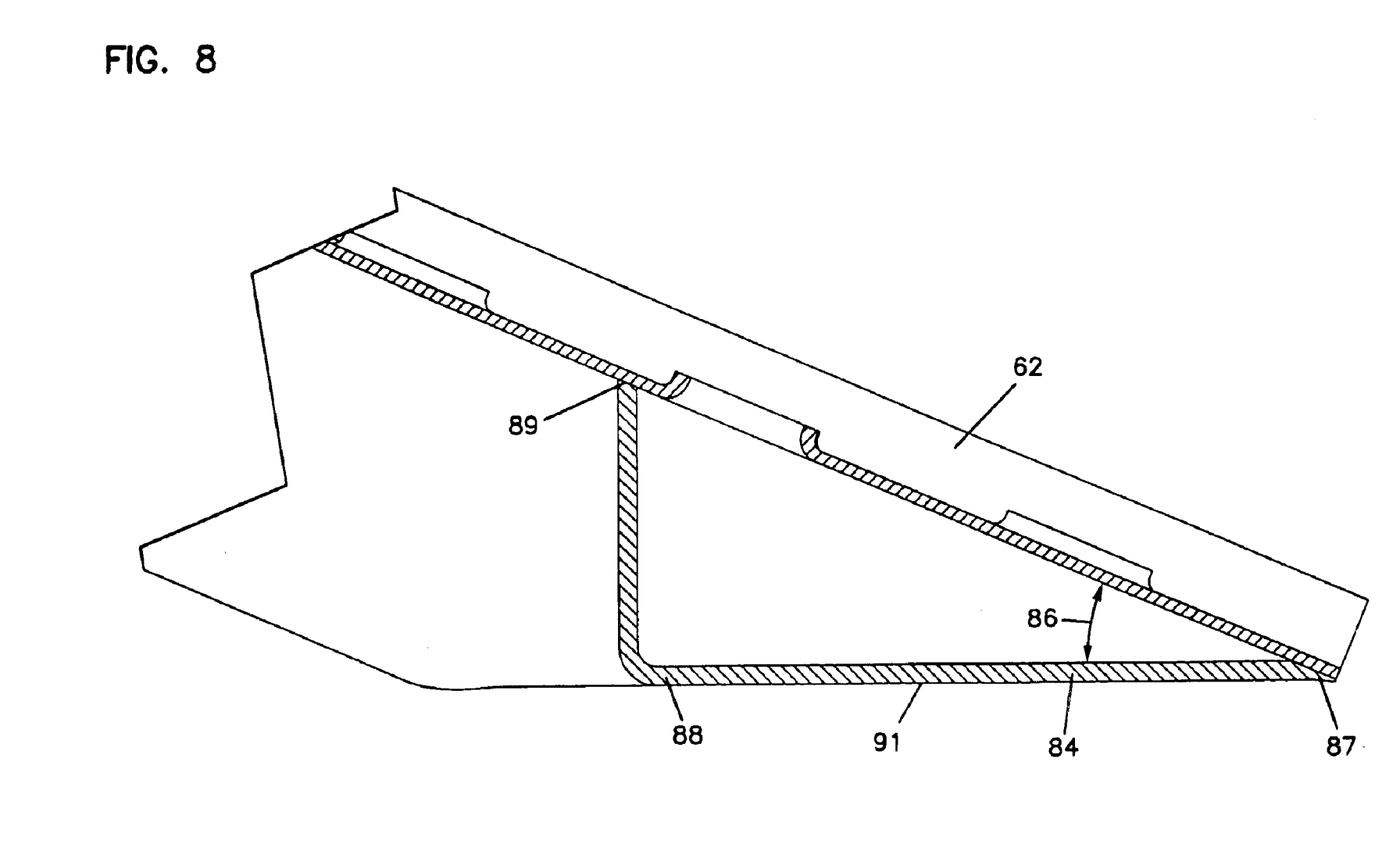
FIG. 8 is a sectional view of the folding ramp of FIG. 1 taken along lines 8—8.

Now referring to FIG. 8, the lower ramp second end 62 is shown having a ground engaging member 84 that is provided for resting on the ground. The ground engaging member 84 can be provided so that it extends form the lower ramp second end 62 at an angle 86 that is about the same angle that the ramp 10 forms relative to the ground when the ramp 10 is provided on the back of a standard pickup truck. In order to provide structural support, the ground engaging member 84 can be attached to the lower ramp second end 62 at at least two locations. The first attachment location 87 is provided at the end of the lower ramp second end 62, and the second attachment location 89 is provided further up the lower ramp second end 62. The ground engaging member 84 is provided as an L-shaped member 88. In addition, the ground engaging member 84 can have a surface 91 that helps provide anti-skid properties to reduce movement of the ramp 10 relative to the ground. An exemplary anti-skid pattern that can be provided on the surface 91 is a diamond pattern.

The ramp 10 includes a handle assembly 100 that provides for ease of transport. The handle assembly 100 can include a handle member 102 and handle attachment sleeves 104 and 106 to hold the handle member 102 to the ramp 10. As shown in FIGS. 1 and 2, the handle assembly 100 is attached to the lower ramp first side support 66. It should be understood that the handle assembly can be provided on any of the side supports. For example, the handle assembly can be provided on the upper ramp side supports if the ramp is constructed so that the lower ramp nests within the upper ramp. The ramp assembly 100 can be constructed so that the handle member 102 rotates within the sleeves 104 and 106. This allows the handle member 102 to fold close to the ramp for storage.

It should be understood that one technique for connecting the various components of the ramp together includes welding. It should be understood that other techniques for attachment can be used as long as the technique provides a desired level of strength and longevity.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A folding ramp comprising:
   (a) an upper ramp extending from a first end to a second end, the upper ramp comprising:
      (i) an upper ramp loading track having a first side and a second side;
      (ii) an upper first side support extending along the first side of the upper ramp loading track;
      (iii) an upper second side support extending along the second side of the upper ramp loading track;
      (iv) a vehicle mounting member attached to the first end of the upper ramp and comprising a first arm constructed for extension onto a vehicle tailgate and a second arm extending underneath the upper ramp loading track and attached to the upper first side support and the upper second side support; and
      (v) a rotation member; and
   (b) a lower ramp extending from a first end to a second end, the lower ramp comprising:
      (i) a lower ramp loading track having a first side and a second side;
      (ii) a lower first side support extending along the first side of the lower ramp loading track;
      (iii) a lower second side support extending along the second side of the lower ramp loading track; and
      (iv) the rotation member provided to allow rotation of the lower ramp relative to the upper ramp.

2. A folding ramp according to claim 1, further comprising at least one handle assembly provided on the upper ramp or the lower ramp.

3. A folding ramp according to claim 1, further comprising a chain extending from the upper ramp loading track for engaging a vehicle for holding the ramp in place relative to the vehicle.

4. A folding ramp according to claim 1, wherein the first end of the lower ramp extends beyond the rotation member to provide an overlap of the lower ramp over the upper ramp.

5. A folding ramp according to claim 1, where the first end of the lower ramp extends at least three inches beyond the rotation member.

6. A folding ramp according to claim 1, wherein the upper ramp loading track and the lower ramp loading track include a skid-resistant surface.

7. A folding ramp according to claim 6, wherein the skid-resistant surface comprises a plurality of die punched openings.

8. A folding ramp according to claim 1, wherein the rotation member comprises a steel bar.

9. A folding ramp according to claim 8, wherein the steel bar comprises a nut and bolt arrangement.

10. A folding ramp according to claim 1, wherein the upper ramp comprises an underneath support extending between the upper first side support and the upper second side support for supporting the upper ramp loading track.

11. A folding ramp according to claim 1, wherein the lower ramp comprises an underneath support extending between the lower first side support and the lower second side support for supporting the lower ramp loading track.

12. A folding ramp according to claim 1, wherein the upper ramp further comprises a cap attached at the first end of the upper ramp and extending from the upper first side support to the upper second side support for strengthening the upper ramp.

13. A folding ramp according to claim 12, wherein the upper ramp further comprises a pad on the cap for reducing scratching.

14. A folding ramp according to claim 1, wherein the upper ramp further comprises a pad on the first arm for reducing scratching.

15. A folding ramp according to claim 1, wherein the second arm of the vehicle mounting member is welded to the upper first side support and the upper second side support.

* * * * *